US008468405B2

(12) United States Patent
McLaurin et al.

(10) Patent No.: US 8,468,405 B2
(45) Date of Patent: Jun. 18, 2013

(54) INTEGRATED CIRCUIT TESTING

(75) Inventors: Teresa Louise McLaurin, Dripping Springs, TX (US); Gerard Richard Williams, Los Altos, CA (US)

(73) Assignee: ARM Limited, Cambridge (GB)

( * ) Notice: Subject to any disclaimer, the term of this patent is extended or adjusted under 35 U.S.C. 154(b) by 363 days.

(21) Appl. No.: 12/929,031

(22) Filed: Dec. 22, 2010

(65) Prior Publication Data

US 2012/0166902 A1    Jun. 28, 2012

(51) Int. Cl.
  *G01R 31/28* (2006.01)
(52) U.S. Cl.
  USPC .......................................................... 714/729
(58) Field of Classification Search
  USPC ..... 714/27–34, 39–42, 48–51, 715, 720–722, 714/726–729, 733–739
  See application file for complete search history.

(56) References Cited

U.S. PATENT DOCUMENTS

| | | | | |
|---|---|---|---|---|
| 6,941,498 B2 * | 9/2005 | Hartano et al. | | 714/729 |
| 7,051,257 B2 * | 5/2006 | Whetsel | | 714/729 |
| 7,734,974 B2 * | 6/2010 | Aitken et al. | | 714/729 |
| 8,055,962 B2 * | 11/2011 | Antley et al. | | 714/726 |
| 2003/0172334 A1 * | 9/2003 | Hartano et al. | | 714/729 |
| 2005/0108604 A1 * | 5/2005 | Wong | | 714/726 |
| 2005/0138514 A1 * | 6/2005 | Burdine et al. | | 714/733 |
| 2005/0193294 A1 * | 9/2005 | Hildebrant | | 714/723 |
| 2009/0019329 A1 * | 1/2009 | Aitken et al. | | 714/729 |

OTHER PUBLICATIONS

R. Leveugle et al, "Design of Microprocessors with Built-In On-Line Test" IEEE 1990, pp. 450-456.
G. Xenoulis et al, "Instruction-Based Online Periodic Self-Testing of Microprocessors with Floating-Point Units" *IEEE Transactions on Dependable and Secure Computing*, vol. 6, No. 2, Apr. 2009, pp. 124-134.
Y. Li et al, "Concurrent Autonomous Self-Test for Uncore Components in System-on-Chips" 6 pages.
Y. Li et al, "CASP: Concurrent Autonomous Chip Self-Test Using Stored Test Patterns" EDAA 2008, 6 pages.

* cited by examiner

*Primary Examiner* — Nadeem Iqbal
(74) *Attorney, Agent, or Firm* — Nixon & Vanderhye P.C.

(57) ABSTRACT

An integrated circuit 2 provided with multiple functional units 6, 8, 10, 12, 14, and 16 for performing data processing operations as part of advancing execution of a data processing task by the integrated circuit 2. Activity detection circuitry 26 determines which of these functional circuits is inactive at the given time. If a functional is inactive, then scan control circuitry 28 may perform a scan test operation thereon using an associated serial scan chain 34, 36, 38, 40, 42, 44.

16 Claims, 4 Drawing Sheets

INTEGRATED CIRCUIT TESTING

BACKGROUND OF THE INVENTION

1. Field of the Invention

This invention relates to the field of integrated circuits. More particularly, this invention relates to the testing of integrated circuits to ensure there correct operation.

2. Description of the Prior Art

It is known to provide integrated circuit with mechanisms to permit test operations to be performed on the integrated circuits to ensure their correct operation. These tests may be performed after manufacture to ensure the integrated circuits are properly formed and function correctly before they are used. One known type of testing mechanism uses serial scan chains embedded within the integrated circuit to apply stimulus signals to nodes within the integrated circuit and then to capture response signals from the integrated circuit. The observed response signals are then compared with expected response signals. Any difference between the observed response signals and the expected response signals indicate that the integrated circuit is not formed or operating correctly.

While such manufacturing tests performed using serial scan chain are effective at identifying manufacturing defects, there exist the possibility that an integrated circuit may ceased the function when it is incorporated within a larger device or during its later use within that larger device, e.g. due to wear out, particle strike damage etc. This problem is particularly significant when the integrated circuit is involved within a safety critical system, such as the braking system of a car. Such safety critical applications often require the integrated circuit to rapidly respond to detected conditions and this capability should not be interrupted when the integrated circuit is in use.

SUMMARY OF THE INVENTION

Viewed from one aspect the present invention provides an integrated circuit comprising:

a plurality of functional circuits each configured to perform data processing operations as part of said integrated circuit executing a data processing task;

activity detection circuitry coupled to each of said plurality of functional circuits and configured to detect when a functional circuit of said plurality of functional circuits has an inactive state during functional operation of said integrated circuit in which said functional circuit is not performing data processing operations advancing execution of said data processing task;

a plurality of serial scan chains each coupled to a functional circuit of said plurality of functional circuits and configured to perform a scan test operation upon said functional circuit by applying stimulus signals to said functional circuit and capturing response signals from said functional circuit;

scan control circuitry coupled to said activity detection circuitry and to said plurality of serial scan chains and configured to initiate a scan test operation using a serial scan chain coupled to a functional circuit detected by said activity detection circuitry as having said inactive state during said execution of said data processing task; and error detection circuitry coupled to said plurality of serial scan chains and configured to detect if response signals captured from said functional circuit during said scan test operation differ from expected response signals indicating an error in operation of said functional circuit.

The present techniques recognise that within more modern integrated circuits there are provided a plurality of functional circuits to perform different roles and not all of these functional circuits are active at any given time. As an example, an integrated circuit may include an integer data path, a floating point unit, a SIMD unit, a DSP unit, etc with these different units being active at different times depending upon the particular processing required. It is known that when particular functional circuits are not required during functional operation, then they may be placed into a power saving state and later returned to an operational state when they are required to be active. The present technique provides serial scan chains for the different functional circuits which may be inactive at different times and uses activity detection to determine when a functional circuit is in an inactive state. When a functional circuit is detected as being in an inactive state, then a scan controller can initiate a scan test operation using a serial scan chain coupled to the functional circuit concerned as the functional circuit is not required to advance the execution of the data processing task being performed by the integrated circuit as a whole. Thus, the operational use of the integrated circuit is not impeded as the functional circuits are subject to scan test operations when they are inactive and not required for other purposes. This achieves an "online" test of the integrated circuit during its normal functional operation without having to switch the integrated circuit in to a test mode and render it "offline" with respect to performing functional mode processing. The technique can take advantage of natural periods of inactivity, of functional units to test these without disrupting functional operation of the integrated circuit.

It will be appreciated that depending upon the data processing task being executed by the integrated circuit, a functional circuit which is inactive and undergoing a scan test operation may become required to advance execution of the data processing task. In order to deal with this situation, in some embodiments the activity detection circuitry is configured to detect if the functional circuit undergoing scan test operation is required for the processing task and, if so, to abort the scan test operation. This frees the functional circuit concerned to perform the data processing operations required to advance the data processing task being performed by the integrated circuit.

Some functional circuits may hold state data required when exiting their inactive state. In this case, the scan control circuitry may be configured to save the state data from the functional circuit to a state data memory before the scan test operation is performed and to restore the state data from the state data memory to the functional circuit after the scan test operation is stopped. The stopping of the scan test operation may be because the scan test operation has fully completed successfully or because it has been aborted as a consequence of the functional circuit becoming required for use in the data processing task being performed by the integrated circuit as a whole.

In order to prevent excessive testing of functional circuits which would needlessly waste power, the scan control circuitry maybe configured to inhibit initiation of a scan test operation upon a functional circuit unless greater than predetermined minimum test interval has expired since that functional circuit was last subject to a scan test operation. This permits, for example, an inactive functional circuit to be placed in a power saving state if it is not required and has recently been subjected a successful scan test operation.

The scan control circuitry may be able to conduct only a single scan test operation at a given time or it may be possible to control multiple scan test operations simultaneously. However, if the number of functional circuits detected to be in the inactive state exceeds the capabilities of the scan control circuitry to simultaneously conduct scan test operations, then a selection of which of the functional circuits should be tested can be made in accordance with one of a plurality of different selection algorithms. These selection algorithms may include a round robin selection algorithm, a random selection algorithm and a priority based selection algorithm in which different functional circuits have different priorities associated with them such that functional circuits of a higher priority are tested in preference to functional circuits of a lower priority.

The scan control circuitry may also be used to impose a maximum test interval between scan test operations performed on the functional circuits. If this maximum test interval is exceeded, then the scan control circuitry may be configured to force the functional circuit to undergo a completed scan test operation irrespective for whether the functional circuit is performing data processing operations advancing execution of the data processing task. While this may interfere with the normal execution of the data processing task, the benefit of ensuring that the functional circuit is operating correctly may outweigh this.

The stimulus signals applied by the serial scan chains may be read from a stimulus signal memory under control of the scan control circuitry. It will be appreciated by those in this technical field that the stimulus signals are test vectors which may be automatically generated by automatic test pattern generation algorithms and the like.

The stimulus signal memory may be external to the integrated circuit.

The error detection circuitry can take a variety of different forms. One convenient form which its sensitive to the response signals having the correct form and which consumes relatively little resource in terms of circuit area a storage requirements is one in which the error detection circuitry includes a multiple input shift register for combining, with a logical XOR function, the response signals with signals stored within the multiple input shift register to generate a signature value. This signature value may then be compared with an expected signature value upon completion of the scan test operation to check that the expected signature value has been produced.

As previously mentioned, the present online testing techniques, which test portions of an integrated circuit during its operation, may be conveniently provided in combination with power control circuitry which switches functional circuits having the inactive state from an operational state to a power saving state. Within such systems the activity detection circuitry can provide useful information both to the scan control circuitry and the power control circuitry. The scan control circuitry may be configured to switch a functional circuit as necessary from the power saving state to the operational state in order to perform a scan test operation.

It will be appreciated that the integrated circuit can take a wide variety of different forms. One example form of the integrated circuit is where the functional circuits are part of a processor core and the data processing task is execution of a stream of program instructions. Within such an environment it is likely that parts of the processor core will not be required to execute at least some of the instructions within a stream of program instructions.

The plurality of functional circuits may be pipeline stages within the processing pipeline of a processor core.

Viewed from another aspect the present invention the present invention provides an integrated circuit comprising:

a plurality of functional circuit means for performing data processing operations as part of said integrated circuit executing a data processing task;

activity detection means coupled to each of said plurality of functional circuit means for detecting when a functional circuit means of said plurality of functional circuit means has an inactive state during functional operation of said integrated circuit in which said functional circuit means is not performing data processing operations advancing execution of said data processing task;

a plurality of serial scan chain means each coupled to a functional circuit means of said plurality of functional circuit means for performing a scan test operation upon said functional circuit means by applying stimulus signals to said functional circuit means and capturing response signals from said functional circuit means;

scan control means coupled to said activity detection means and to said plurality of serial scan chain means for initiating a scan test operation using a serial scan chain coupled to a functional circuit means detected by said activity detection means as having said inactive state during said execution of said data processing task; and error detection means coupled to said plurality of serial scan chain means for detecting if response signals captured from said functional circuit means during said scan test operation differ from expected response signals indicating an error in operation of said functional circuit means.

Viewed from a further aspect the present invention provides a method of testing an integrated circuit during execution of a processing task, said method comprising the steps of:

performing data processing operations with a plurality of functional circuits as part of said integrated circuit executing said data processing task;

detecting when a functional circuit means of said plurality of functional circuit means has an inactive state during functional operation of said integrated circuit in which said functional circuit means is not performing data processing operations advancing execution of said data processing task;

initiating a scan test operation using a serial scan chain coupled to a functional circuit means detected as having said inactive state during said execution of said data processing task, said scan test operation comprising applying stimulus signals to said functional circuit and capturing response signals from said functional circuit; and detecting if response signals captured from said functional circuit during said scan test operation differ from expected response signals indicating an error in operation of said functional circuit.

The above, and other objects, features and advantages of this invention will be apparent from the following detailed description of illustrative embodiments which is to be read in connection with the accompanying drawings.

DESCRIPTION OF EMBODIMENTS

Figure 1:
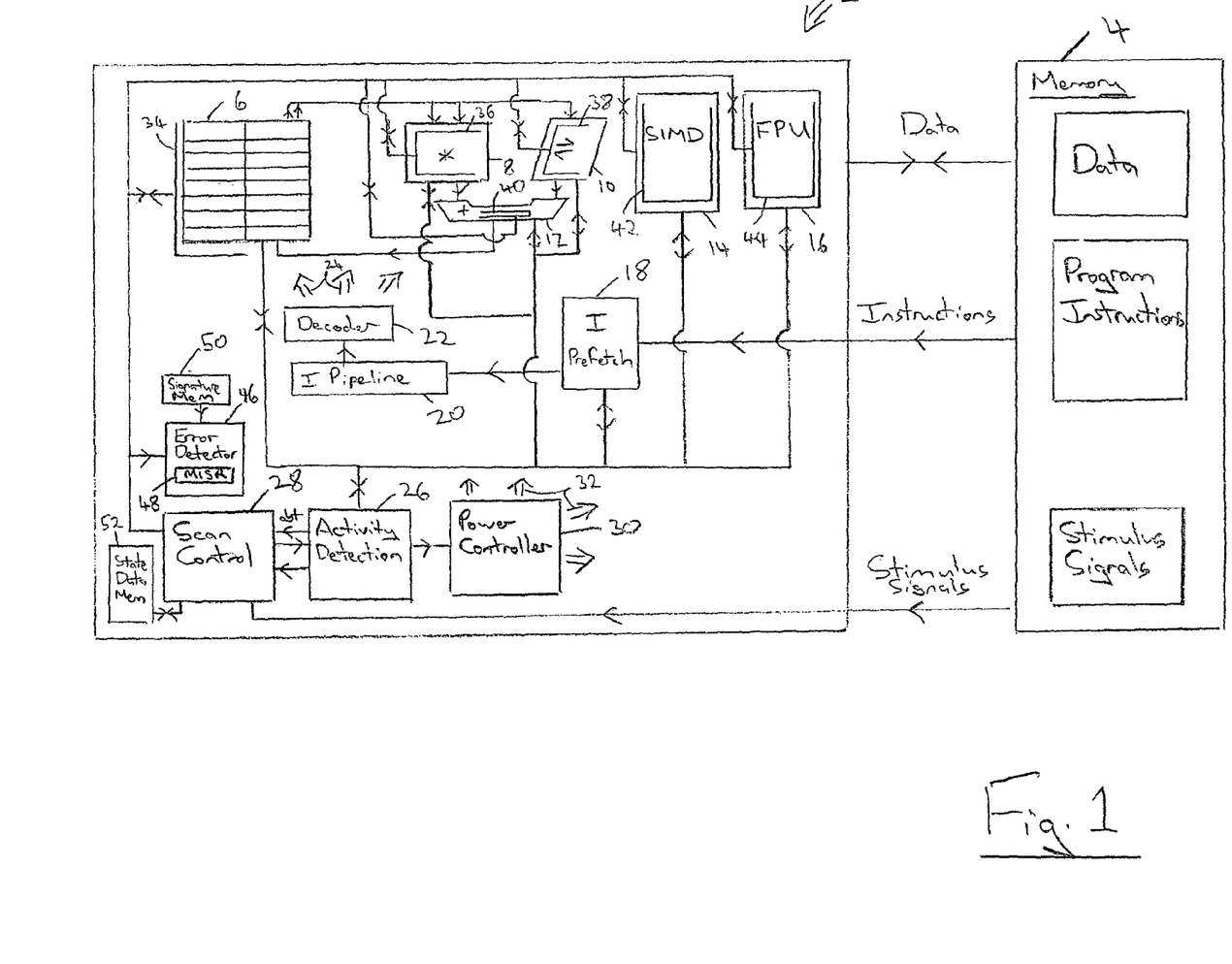
FIG. 1 schematically illustrates an integrated circuit supporting online serial scan chain testing of portions of the integrated circuit.

FIG. 1 schematically illustrates circuit 2, which may be a system-on-chip integrated circuit, coupled to a memory 4. The integrated circuit 2 includes a plurality of functional circuits including a register file 6, a multiplier 8, a shifter 10, an adder 12, a single-instruction-multiple-data (SIMD) unit 14 and a floating point unit (FPU) 16. These functional units may be considered as forming data paths within the integrated circuit 2 as part of a processor core. It will be appreciated by those in this technical field that the integrated circuit 2 may typically also include many additional functional circuits which are not illustrated, such as a digital signal processing unit, a direct memory access unit, a cache memory etc.

The integrated circuit 2 is coupled to the memory 4. The memory 4 stores data values to be manipulated and program instructions for forming a stream of program instructions for controlling the processor core. The program instructions are fetched by an instruction fetch unit 18 and supplied to an instruction pipeline 20. An instruction decoder 22 coupled to the instruction pipeline 20 decodes program instructions and generates control signals 24 which control the different functional circuits within the integrated circuit to perform a data processing task specified by the stream of program instructions. It will be appreciated that not all of the functional circuits will be required to be active at all times. As an example, when performing a sequence of SIMD instructions, the integer data path involving the multiplier 8, the shifter 10 and the adder 12 may not be required. Similarly, when performing integer data processing tasks, the SIMD unit 14 and the floating point unit 16 will not be required.

Activity detection circuitry 26 coupled to the different functional circuits within the integrated circuits 2 detects when these functional circuits are in an inactive state, i.e. not required to perform data processing operations to advance the execution of the processing task being performed by the integrated circuit. The activity detection circuitry 26 may also be responsive to the control signals 24 generated by the instruction decoder 22 as these will typically carry the information concerning which functional circuits are required to be active at any given time. The activity detection circuitry 26 is coupled to scan control circuitry 28 and power control circuitry 30. The activity detection circuitry 26 indicates to the scan control circuitry 28 and the power control circuitry 30 which of the functional circuits is in an inactive state at any given time. The activity detection circuitry 26 also indicates, using an abort signal supplied to the scan control circuitry 28, when a functional circuit currently being subject to a scan test operation under control of the scan control circuitry 28 is required to become active to advance execution of a processing task of the integrated circuit 2 and accordingly that the scan test operation should be aborted. The power control circuitry 30 generates power control signals 32 which are supplied to the different functional circuits and which served to switch the functional circuits between an operational state and a power saving state depending on whether they are required for online scan testing and whether they an inactive in that they are not required to advance execution of the processing task being performed by the integrated circuit 2.

A plurality of serial scan chain 34, 36, 38, 40, 42 and 44 are associated with the different functional circuits 6, 8, 10, 12, 14, 16 which are to be subject to scan task operations when they are inactive. When the activity detection circuitry 26 indicates to the scan control circuitry 28 that a functional circuit is inactive, the scan control circuitry 28 can read stimulus signals (ATPG vectors) stored within the memory 4, serially scan these through the desired serial scan chain 36, 38, 40, 42, 44, and control the application of those stimulus signals to the functional circuit concerned as well as the capture of the response signals generated and the serial scanning of those response signals back to error detection circuitry 46.

As the response signals are being serially scanned back to the error detection circuitry 46 the next set of stimulus signals may be serially scanned in to the selected serially scan chain 34, 36, 38, 40, 42, 44.

It may be that the scan control circuitry 28 can only control a single scan test operation to be active at any given time. It is also possible that the scan control circuitry 28 may control multiple scan test operations to be performed simultaneously.

When a scan test operation has been completed by the application of all of the stimulus signals for that functional circuit and the reading of the response signals therefrom, the error detection circuitry 46 can detect and indicate whether or not the functional circuit concerned has passed or failed the scan test operation. The error detection circuitry 46 includes a multiple input shift register 48 into which the response signals are combined using a logical XOR operation to produce a signature signal. The final signature signal stored within the multiple input shift register 48 when the scan test operation is completed can be compared with the expected signature value read from a signature memory 50 to determine whether or not the observed signature value matches the expected signature value.

Prior to initiating the scan test operation, the scan controller 28 may, if required, read state data from the functional circuit to be tested and save this within a state memory 52. Upon completion of the scan test operation this state data may be restored to the functional circuit under test. An example of such state data would be the contents of the registers within the register file 6. While the register file 6 may be inactive at any given time, it is necessary that the contents of register file be preserved during periods of inactivity as the programming model will assume that the contents of the register file 6 do not change unless acted upon by program instructions.

Figure 2:
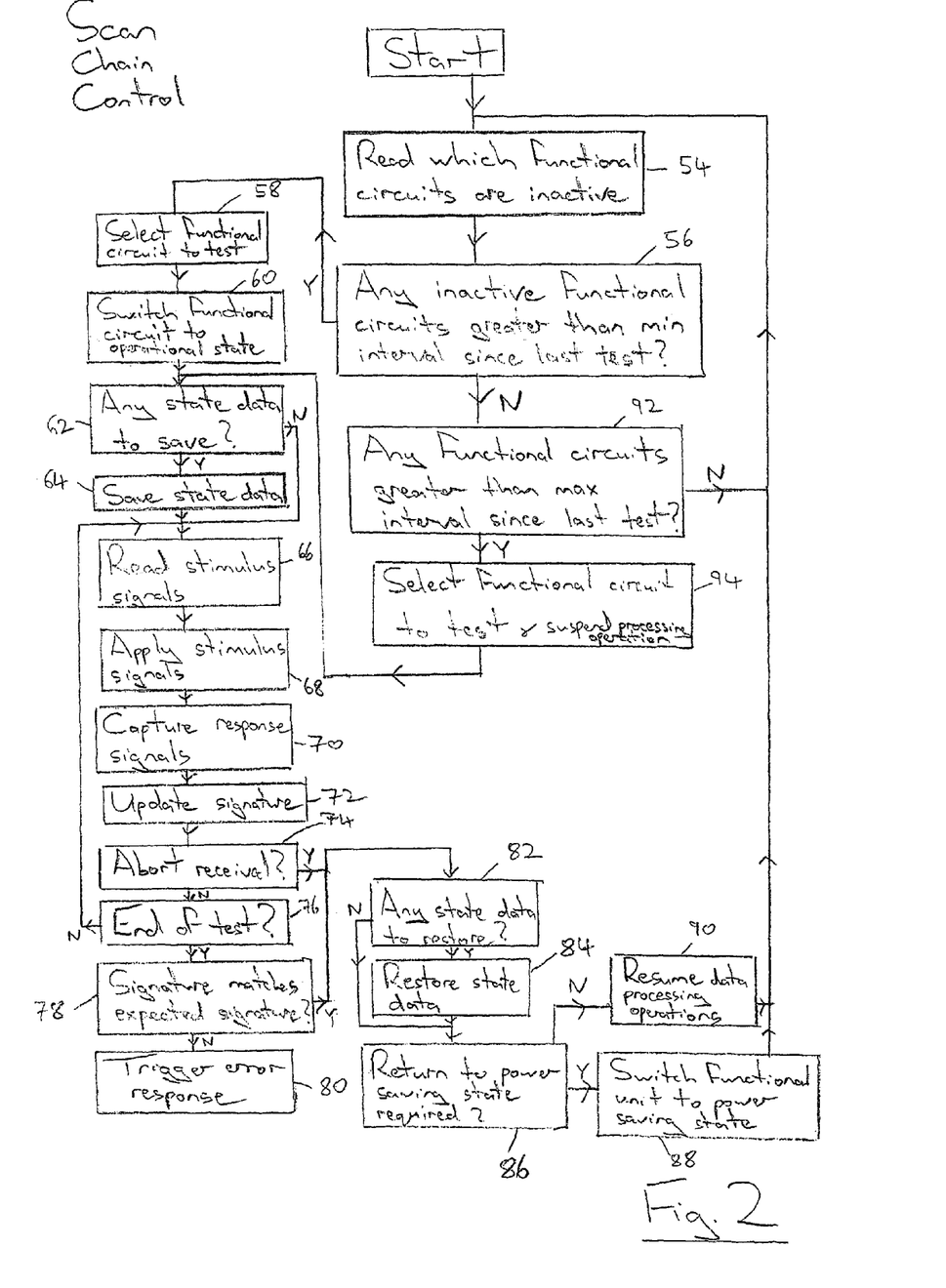
FIG. 2 is a flow diagram schematically illustrating the operation of a scan chain controller.

FIG. 2 is a flow diagram schematically illustrating the operation of the scan controller 28. At step 54 the scan controller 28 reads which functional circuits are inactive as indicated by the activity detection circuitry 26. Step 56 determines if there are any inactive functional circuits for which it is greater than the minimal interval since there last completed scan test operation was performed. A minimum interval may be set so as to avoid an inactive functional circuit been repeatedly subject to a scan test operation when it is inactive thereby wasting energy. If there is at least one inactive functional circuit for which it is greater than the minimum interval since it was last subject to a scan test operation, then processing proceeds to step 58 where a functional circuit is selected for testing. If only a single functional circuit meets the requirements at step 56, then this single functional circuit will be tested. However, if multiple functional circuits are inactive and due to be tested, then step 58 can determine in accordance with a selection algorithm which of these functional circuits should be tested. The selection algorithm may be a round robin selection algorithm, a random selection algorithm (good for avoiding pathological cases in which a functional circuit is never tested) and a priority based selection algorithm in which different functional circuits have different priority values associated there with such that functional circuits with higher priority values are selected for testing over functional circuits with lower plurality values.

Step 60 switches the functional circuit selected for testing to an operational state from a power saving state. Step 62 determines if any state data is associated with that functional circuit which should be saved within the state data memory 52. If there is state data to save, then step 64 saves this state data to the state data memory 52. If there is no state data to save, then step 64 is bypassed.

Step 66 reads the stimulus signals from the memory 4 and serially scans these into the serial scan chain, 34, 36, 40, 42, 44 associated with the functional circuit under test. Step 68 applies these stimulus signals to the functional circuit being tested. Step 70 captures the response signals from the functional circuit and step 72, scans these out of the serial scan chain and applies them to the multiple input shift register 48 within the error detection circuitry 46 to update the signature value.

Step 74 determines whether or not an abort signal has been received from the activity detection circuitry 26. This abort signal indicates that the functional circuit concerned is required to advance execution of the data processing task being performed by the integrated circuit 2 and accordingly is no longer available for the scan test operation which should be aborted. If no abort signal is received, then step 76 determines whether the end of the scan test operation has yet been reached. If the end of this can test operation has not yet been reached, then processing proceeds to steps 66 where the next set of stimulus signals (test vector) is applied to the functional circuit under test. If the end of the test operation has been reached, then processing proceeds to step 78 where the signature generated within the multiple input shift register 48 is compared with the expected signature read from the signature memory 50. If the signatures do not match, then step 80 triggers an error response, which may be to indicate an error to a user, to enter a failsafe mode or some other response.

If the signatures match at step 78, then processing proceeds to step 82 where it is determined whether there is any saved state data stored within the state data memory 52 which requires restoring to the functional circuit under test now that the scan test operation has completed. If there is state data to be restored, then this is read from the state data memory 52 and restored to the functional circuit at step 84. If there is no state data to be restored, then step 84 is bypassed.

Step 86 determines whether or not it is necessary to return the functional circuit which has been subject to the scan test operation to the power saving state. If the scan test operation at steps 66, 68, 70, 72, 74, 76 and 78 was entered via step 60, then it will be appropriate to return the functional circuit to the power saving state at step 88. Otherwise, processing proceeds to step 90 and which the data processing operations which were interrupted by the scan test operation are resumed.

If the determination at step 56 was that there are no inactive functional circuits for which it is greater than the minimum interval since there last test, then processing proceeds to step 92 where a determination is to made as to whether or not there are any functional circuits for which it is greater than the maximum interval since there last test. If there are no such functional circuits, then processing which turns to step 54. If there are functional circuits for which the maximum interval since there last task has been exceeded, then processing proceeds to step 94 at which one or more of such functional circuits is selected for scan test operation and the processing operations being performed by that functional circuit suspended. As such as functional circuit will be in the operational state, step 60 may be bypassed and processing past to step 62.

Figure 3:
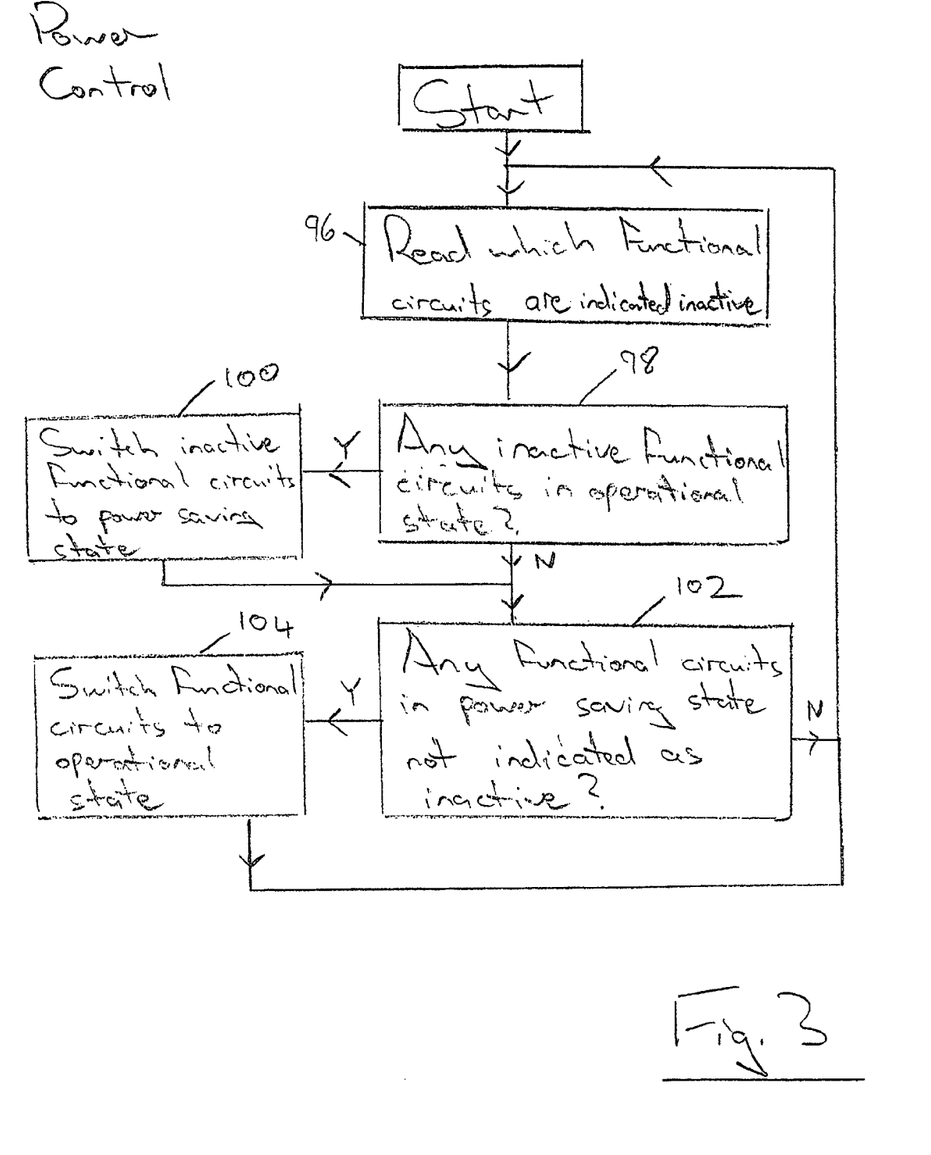
FIG. 3 is a flow diagram schematically illustrating operation of a power controller.

FIG. 3 is a flow diagram schematically illustrating the operational of the power control circuitry 30. At step 96 the power control circuitry 30 reads from the activity detection circuitry 26 which functional circuits are indicated as inactive (i.e. are indicated as not being currently required to process the stream of program instructions under execution). Step 98 determines whether there are any inactive functional circuits which are currently in the operational state. If there are any inactive functional circuits currently in there operational state, then these are switched to power saving state at step 100. Step 102 determines whether there are any functional circuits in the power saving state which are not indicated as inactive. This corresponds with a desire to wake up the functional circuits concerned as they are now required to perform data processing operations. If there are functional circuits requiring such a wake up, then this is performed at step 104 where a switch of the functional circuits from the power saving state to the operational state it is made.

Figure 4:
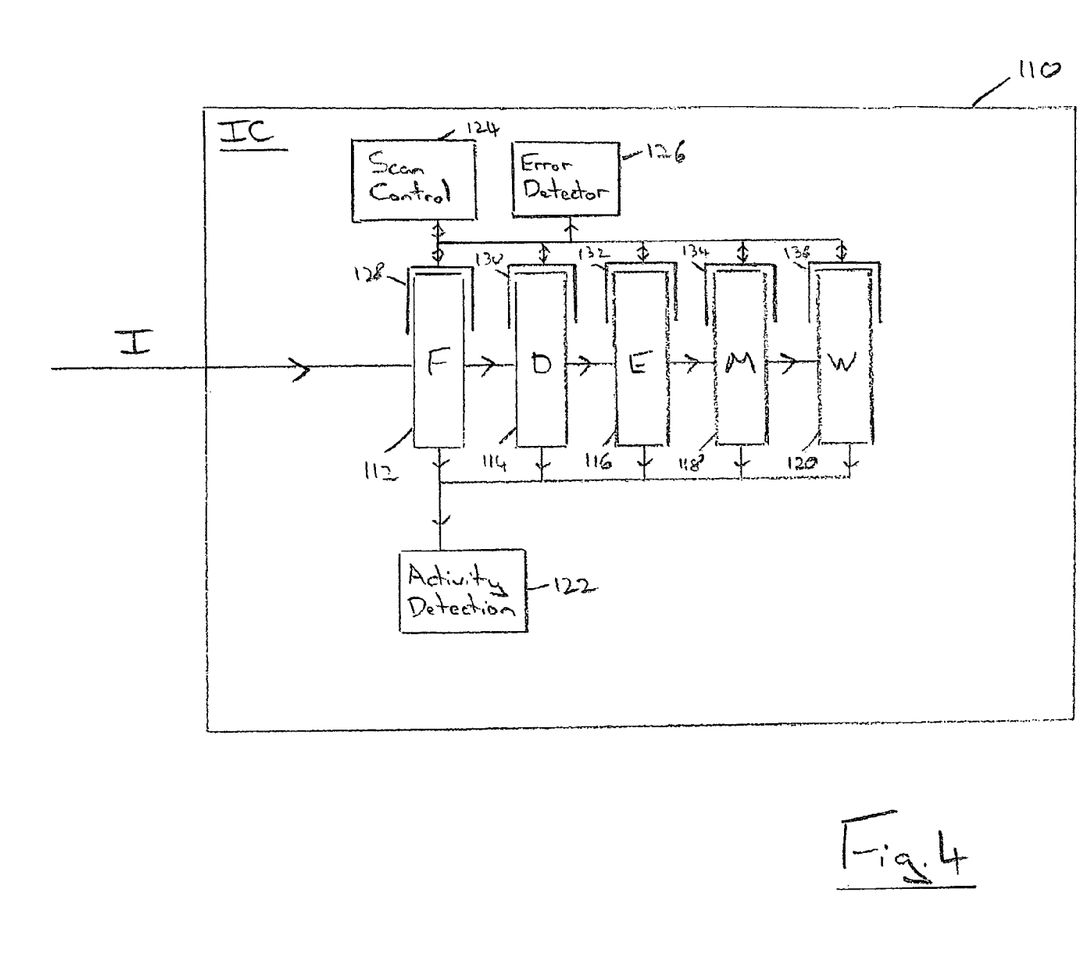
FIG. 4 schematically illustrates another example of an integrated circuit supporting online serial scan chain testing.

FIG. 4 schematically illustrates another example of an integrated circuit supporting online serial scan chain testing. In this example embodiment an integrated circuit 110 includes a five stage instruction pipeline including a fetch stage 112, a decode stage 114, an execute stage 116, a memory access stage 118 and a writeback stage 120. This general type of pipeline processor will be familiar to those in this technical field. It will be appreciated that the integrated circuit 110 will typically contain many further circuit elements which have been omitted from FIG. 4 for the sake of clarity.

Also provided within the integrated circuit 110 are activity detection circuitry 122, scan control circuitry 124 and error detection circuitry 126. The activity detection circuitry 122 is coupled to the pipeline stages 112, 114, 116, 118, 120 and serves to detect when any of the stages are in an inactive state during functional operation of the integrated circuit. Such inactive states can arise naturally during functional operation. As an example, if during a particular period the fetch stage 112 does not fetch any instructions, then as soon as the decode stage 114 becomes inactive (finishes decoding whatever instructions it is currently decoding) there will be no further instructions to be passed to it from the fetch stage 112 and accordingly the activity detection circuitry 122 can detect the decode stage 114 as entering an inactive state. The decode stage 114 can thus be subject to testing during this inactive state without interfering with the overall functional operation of the integrated circuit 110. Thus, the testing of the decode stage 114 can be considered to take place online without having to place the integrated circuit 110 into a test mode and take if offline from its normal processing operations.

Also illustrated in FIG. 4 are scan chains 128, 130, 132, 134, 136 associated with the respective pipeline stages 112, 114, 116, 118, 120. When a pipeline stage 112, 114, 116, 118, 120 is detected as being in the inactive state by the activity detection circuitry 122, then the scan control circuitry 124 can initiate a serial scan chain test thereupon using the appropriate serial scan chain 128, 130, 132, 134, 136. The error detection circuitry 126 can detect if there is any error in the pipeline stage 112, 114, 116, 118, 120 using the returned scan chain data as previously discussed.

The above described example in which it may be determined that the decode stage 114 is inactive may also be applied to the execute stage 116, the memory access stage 118 and the writeback stage 120. The activity detection circuitry 122 can detect when instructions are passed from the fetch stage 112 into the rest of the instruction pipeline as part of determining when the respective stages of the instruction pipeline will be inactive. It will be appreciated that some instructions may take multiple processing cycles to execute within a processing stage and so the determination of downstream activity cannot be based solely upon the action of the fetch stage 112.

If it is desired to force a test, then it is possible to stall the fetch stage 112 and wait for the rest of the pipeline stages 114, 116, 118, 120 to finish their processing and empty. When the pipeline stages 112, 114, 116, 118, 120 are all empty, they may be subject to testing without loosing any state data needed for the functional operation since this state data should already have been emptied from the instruction pipeline. When it is desired to resume processing, the fetch stage 112 can be unstalled so that it will fetch fresh instructions and refill the instruction pipeline.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An integrated circuit comprising:
    a plurality of functional circuits each configured to perform data processing operations as part of said integrated circuit executing a data processing task;
    activity detection circuitry coupled to each of said plurality of functional circuits and configured to detect when a functional circuit of said plurality of functional circuits has an inactive state during functional operation of said integrated circuit in which said functional circuit is not performing data processing operations advancing execution of said data processing task;
    a plurality of serial scan chains each coupled to a functional circuit of said plurality of functional circuits and configured to perform a scan test operation upon said functional circuit by applying stimulus signals to said functional circuit and capturing response signals from said functional circuit;
    scan control circuitry coupled to said activity detection circuitry and to said plurality of serial scan chains and configured to initiate a scan test operation using a serial scan chain coupled to a functional circuit detected by said activity detection circuitry as having said inactive state during said execution of said data processing task; and
    error detection circuitry coupled to said plurality of serial scan chains and configured to detect if response signals captured from said functional circuit during said scan test operation differ from expected response signals indicating an error in operation of said functional circuit.

2. An integrated circuit as claimed in claim 1, wherein said activity detection circuitry is configured to detect if said functional circuit undergoing said scan test operation is required to perform data processing operations to advance execution of said data processing task and, if so, to abort said scan test operation.

3. An integrated circuit as claimed in claim 1, wherein, if said functional circuit stores state data needed when said functional circuit exits said inactive state, then said scan control circuitry is configured to save said state data from said functional circuit to a state data memory before said scan test operation is performed and to restore said state data from said state data memory to said functional circuit after said scan test operation is stopped.

4. An integrated circuit as claimed in claim 1, wherein said scan control circuitry inhibits initiation of said scan test operation upon said functional circuit unless greater than a predetermined minimum test interval has expired since said functional circuit was last subject to said scan test operation.

5. An integrated circuit as claimed in claim 1, wherein, if more than one of said plurality of functional circuits is detected by said activity detection circuitry as having said inactive state, then said scan control circuitry selects in which of said plurality of functional circuits having said inactive state to initiate a scan test operation in according with one of:
    a round robin selection algorithm,
    a priority based selection algorithm; and
    a random selection algorithm.

6. An integrated circuit as claimed in claim 1, wherein if a functional circuit of said plurality of functional circuits has not been subject to a completed scan test operation for greater than a predetermined maximum test interval, then said scan control circuitry can be configured to force said functional circuit to undergo said completed scan test operation irrespective of whether said functional circuit is performing data processing operations advancing execution of said data processing task.

7. An integrated circuit as claimed in claim 1, wherein said stimulus signals are read from a stimulus signal memory under control of said scan control circuitry.

8. An integrated circuit as claimed in claim 7, wherein said stimulus signal memory is external to said integrated circuit.

9. An integrated circuit as claimed in claim 1, wherein said error detection circuitry includes a multiple input shift register for combining with a logical XOR function said response signals with signals stored within said multiple input shift register to generate a signature value.

10. An integrated circuit as claimed in claim 9, wherein signature value within said multiple input shift register is compared to an expected signature value when said scan test operation is completed to detect said error in operation of said functional circuit.

11. An integrated circuit as claimed in claim 1, comprising power control circuitry configured to switch functional circuits having said inactive state from an operational state to a power saving state and said scan control circuitry is configured to switch said functional circuit from said power saving state to said operational state in order to perform said scan test operation.

12. An integrated circuit as claimed in claim 1, wherein said plurality of functional circuits are parts of a processor core and said data processing task is execution of a stream of program instructions.

13. An integrated circuit as claimed in claim 12, wherein a subset of said parts of said processor core are required to execute at least some of said stream of program instructions.

14. Apparatus as claimed in claim 12, wherein at least some of said plurality of functional circuits are pipeline stages within a processing pipeline of said processor core.

15. An integrated circuit comprising:
    a plurality of functional circuit means for performing data processing operations as part of said integrated circuit executing a data processing task;
    activity detection means coupled to each of said plurality of functional circuit means for detecting when a functional circuit means of said plurality of functional circuit means has an inactive state during functional operation of said integrated circuit in which said functional circuit means is not performing data processing operations advancing execution of said data processing task;
    a plurality of serial scan chain means each coupled to a functional circuit means of said plurality of functional circuit means for performing a scan test operation upon said functional circuit means by applying stimulus signals to said functional circuit means and capturing response signals from said functional circuit means;
    scan control means coupled to said activity detection means and to said plurality of serial scan chain means for initiating a scan test operation using a serial scan chain coupled to a functional circuit means detected by said activity detection means as having said inactive state during said execution of said data processing task; and error detection means coupled to said plurality of serial scan chain means for detecting if response signals captured from said functional circuit means during said scan test operation differ from expected response signals indicating an error in operation of said functional circuit means.

16. A method of testing an integrated circuit during execution of a processing task, said method comprising the steps of:
performing data processing operations with a plurality of functional circuits as part of said integrated circuit executing said data processing task;
detecting when a functional circuit means of said plurality of functional circuit means has an inactive state during functional operation of said integrated circuit in which said functional circuit means is not performing data processing operations advancing execution of said data processing task;
initiating a scan test operation using a serial scan chain coupled to a functional circuit means detected as having said inactive state during said execution of said data processing task, said scan test operation comprising applying stimulus signals to said functional circuit and capturing response signals from said functional circuit; and
detecting if response signals captured from said functional circuit during said scan test operation differ from expected response signals indicating an error in operation of said functional circuit.

* * * * *